United States Patent [19]
Vestal

[11] 3,825,067
[45] July 23, 1974

[54] PREPARATION OF AQUEOUS SOLUTIONS OF POLYACRYLAMIDES SUITABLE FOR SUPPLEMENTED RECOVERY OF PETROLEUM

[75] Inventor: Charles R. Vestal, Denver, Colo.

[73] Assignee: Marathon Oil Company, Findlay, Ohio

[22] Filed: Dec. 29, 1972

[21] Appl. No.: 319,431

[52] U.S. Cl............... 166/275, 166/274, 166/305 R
[51] Int. Cl............................................. E21b 43/22
[58] Field of Search................... 166/305, 273–275; 252/8.55 D

[56] References Cited
UNITED STATES PATENTS

| | | |
|---|---|---|
| 2,827,964 | 3/1958 | Sandiford et al.................. 166/274 |
| 3,020,953 | 2/1962 | Zerweck et al..................... 166/274 |
| 3,039,529 | 6/1962 | McKennon......................... 166/275 |
| 3,370,649 | 2/1968 | Wogelmuth......................... 166/274 |
| 3,658,129 | 4/1972 | Lanning et al..................... 166/270 |

*Primary Examiner*—Stephen J. Novosad
*Attorney, Agent, or Firm*—Joseph C. Herring; Richard C. Willson, Jr.; Jack L. Hummel

[57] ABSTRACT

Polyacrylamide gel or polyacrylamide powder is added to water and the pH is adjusted to within the range of from about 7 to about 14, e.g., with NaOH. The mixture is then heated to from about 20° to about 100°C. to form an aqueous solution having good efficiency in the recovery of petroleum from formations.

6 Claims, 4 Drawing Figures

EFFECTS OF STOICHIOMETRY ON PRODUCT INTRINSIC VISCOSITY

CONDITIONS:
MONOMER CONC. = 0.5 WT. %
REACT AT 75°C, 140 RPM
FOR 4 HRS.

3,825,067

PREPARATION OF AQUEOUS SOLUTIONS OF POLYACRYLAMIDES SUITABLE FOR SUPPLEMENTED RECOVERY OF PETROLEUM

CROSS REFERENCES TO RELATED APPLICATIONS

The inventor knows of no closely related United States patent applications.

BACKGROUND OF THE INVENTION

1. Field of the Invention

The present invention relates to the field of secondary recovery of petroleum from formations and to the preparation of drive fluids for such purposes generally classified in United States Patent Office Class 166 subclass 273.

2. Description of the Prior Art

The dissolving of polyacrylamide polymers to prepare aqueous solutions thereof has previously been accomplished by high agitation mixing, by "dusting" the polymer powders on the surface of large bodies of water, by slowly stirring in dilution water, by roll mixing, and by various other techniques. All of these have involved substantial time and the storage of relatively large amounts of solutions. Techniques utilizing high agitation mixing to reduce the time required for the preparation of aqueous solutions have the disadvantage of shear degrading the high molecular weight polyacrylamides.

SUMMARY OF THE INVENTION

General Statement of the Invention

According to the present invention, polyacrylamide powder or polyacrylamide gel is mixed with dilution water and the pH is adjusted to within the range of from about 7 to about 14. The resulting solution is heated to from about 20° to about 100°C. and the resulting aqueous solution is then utilized, e.g., for the secondary-type recovery of petroleum from formations.

It is important to note that the dilution water and the polyacrylamide gel or powder may not at first form a homogeneous solution, but that the pH adjustment is nonetheless made. In short, the base which is added for pH adjustment (and which also apparently accomplishes some partial hydrolysis of the polyacrylamide) can be added to a non-homogeneous mixture. While it would seem likely that this would accomplish rather non-uniform hydrolysis and/or other reaction between the pH adjusting agent and the lumps or particles of polyacrylamide, this is found not to be the case. In fact, the resulting solutions are not only homogeneous but exhibit excellent efficiency in recovering petroleum from formations, even as compared to commercially produced polyacrylamides of high quality.

Utility of the Invention

The present invention is useful for a wide variety of purposes including the secondary-type recovery of petroleum from formations. By "secondary-type recovery of petroleum" is meant a process in which petroleum is displaced within a petroleum-bearing formation through the action of drive fluids. Such recovery may be primary, where the drive fluids are used to supplement the natural gas or water drive of the formation; secondary, where the natural gas or water drive of the formation has been substantially depleted; or tertiary, where the drive fluids are injected after the injection of water flooding media or other conventional displacement fluids. Other uses for the aqueous solutions prepared according to the present invention can include boundary layer fluids for injection along interiors of pipelines to promote the pipelining of high viscosity crude oil and other high viscosity fluids, manometer fluids, etc.

DESCRIPTION OF THE PREFERRED EMBODIMENTS

Starting Materials

The starting materials for the present invention are polyacrylamide polymers, hydrolysis agents, and dilution water.

Polyacrylamide Polymers

The polyacrylamides for use with the present invention may be commercially available unhydrolyzed or partially hydrolyzed polyacrylamides having molecular weights in the range of from above $0.1 \times 10^6$, preferably from $0.5 \times 10^6$ to $40 \times 10^6$, more preferably from $1 \times 10^6$ to $25 \times 10^6$, and most preferably from $3 \times 10^6$ to $20 \times 10^6$. Preferably the polyacrylamide will be present in amounts of from 0.001 to about 50, more preferably from 0.01 to about 10, and most preferably from 0.02 to about 2 weight percent based on the weight of the total aqueous solution.

pH Adjustment Agent

The pH adjustment agent can be any compound which will release hydroxyl ions in aqueous solution, e.g., phosphates such as trisodium phosphate, alkali metal hydroxides such as potassium and sodium hydroxide. The most preferred pH adjustment agent will be sodium hydroxide with trisodium phosphate being slightly less preferred.

In general, the pH adjustment agent will be added in an amount sufficient to cause the aqueous solution to have a pH in the range of from about 7 to about 14, more preferably from about 7.5 to about 13, and most preferably from about 8 to about 12.5. This initial pH lowers as the hydrolysis reaction proceeds.

Water

The water used as a solvent for the aqueous solutions of the present invention can be connate water, for example, Palestine lime water, fresh water, or brackish water. It is preferable that the water contain less than about 300,000, more preferably less than about 10,000, and most preferably less than about 500 parts per million of dissolved solids.

Preparation of Aqueous Solutions

It will generally be preferable to merely mix together the polyacrylamide gel or powdered polyacrylamide with the water, then heat them, e.g., in a steam-heated cone-roofed storage tank. Mild agitation, e.g., a side entry, slow-moving propeller or similar agitator will generally be desirable. Mixing time will preferably be from 0.1 to 100, more preferably 0.5 to 50, and most preferably 1.0 to about 10 hours.

Temperature

Figure 4:
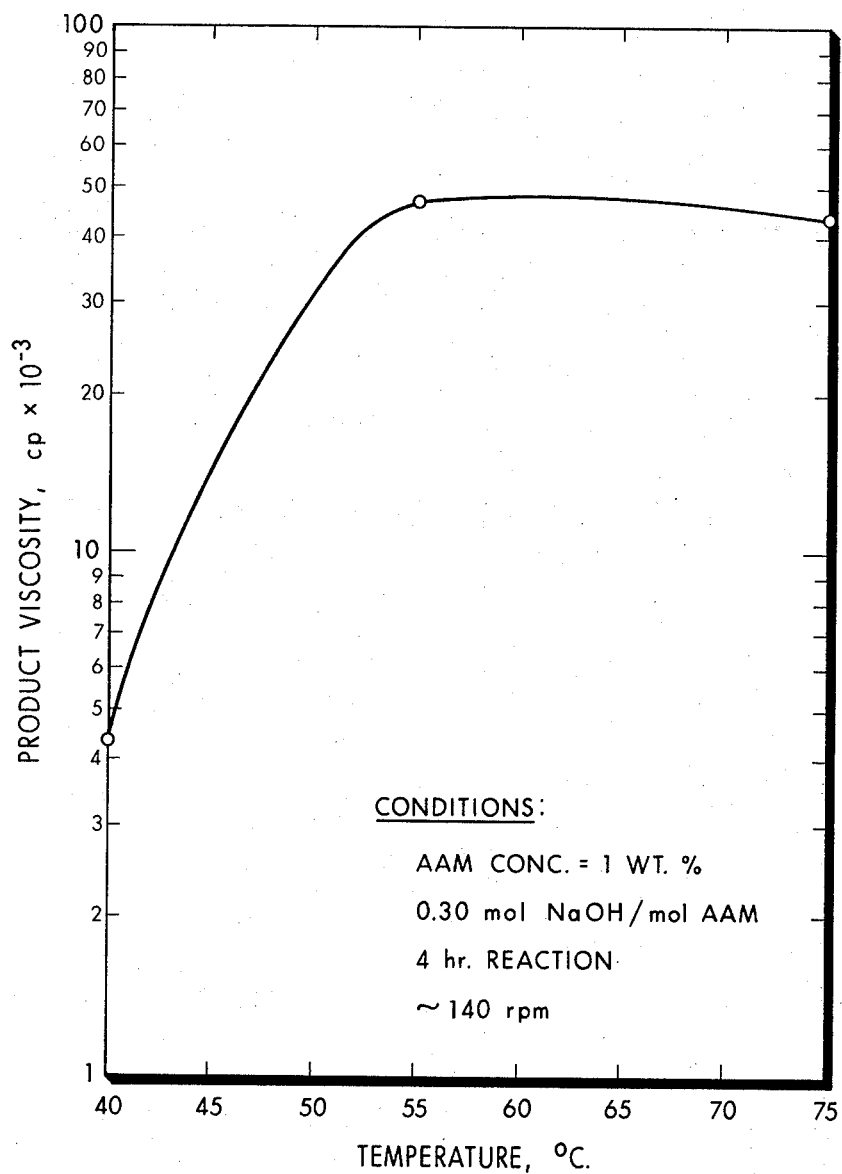
FIG. 4 is a plot showing the effects of reaction temperature on product viscosity for Examples XIII–XV.

After adjustment of the pH, the mixture of water and polyacrylamide and pH adjustment agent will preferably be heated to from about 20 to about 100, more preferably from about 40 to about 80, and most preferably from about 55° to about 75°C. In most cases, boiling will be avoided. While pressure can be used in order to reduce boiling at higher temperatures, and pressures of from sub-atmospheric to above 100 atmospheres could be employed, ambient pressures will generally be most desirable. As illustrated by FIG. 4, the temperature to which the resulting solution is heated is relatively critical inasmuch as the viscosity varies greatly according to the temperature and substantial viscosity increases are not obtained until about 55°C. is reached. On the other hand, heating above about 55°C. produces almost no increase in viscosity and may even effect a minor decrease.

Preparation of Acrylamide Gels

If the polyacrylamide is to be produced in situ rather than being purchased as powder, a solution of from 0.5 to about 15 weight percent acrylamide monomer (commercially available from several sources, e.g., American Cyanamid Co.) in deoxygenated water substantially free from divalent ions (i.e. softened), contacted with from about 10 to about 10,000 parts per million (ppm) of free radical initiator as described below in the presence of from 0.001 to about 0.1 moles of buffer (enough to provide a pH in the range of from about 6 to about 8) for a reaction time in the range of from about 4 to about 48 hours.

More preferred ranges for these quantities will be 2 to about 10 weight percent acrylamide monomer solution, 40 to about 1,000 ppm of free radical initiator, 0.005 to about 0.01 moles of buffer, and a reaction time of from 6 to about 22 hours.

Free Radical Initiators e.g., azobisbutylnitrile, ammonium persulfate, triethanolamine, sodium bisulfite, and ultraviolet light etc., may be employed. Those named will be the more preferred free radical initiators. The most preferred free radical initiators will be ammonium persulfate and sodium bisulfite with a comixture of these two free radical initiators containing from 10 to 90 percent of either of these free radical initiators being most preferred.

Gelation time

After the mixing of the above ingredients, the gel will generally form in about 2 hours. Therefore, the mixture should be permitted to remain quiescent for a period of from about 2 to about 48, more preferably from about 4 to about 30, and most preferably from about 6 to about 22 hours.

Analytical Methods

Analytical methods utilized in the present invention to characterize the polyacrylamide polymers are intrinsic viscosity, screen factor, Brookfield viscosity, and nitrogen content.

Intrinsic Viscosity

Polyacrylamides prepared via the process of the present invention will be defined by their intrinsic viscosity. Intrinsic viscosity is regularly employed by polymer chemists as a measure of molecular weight. As used in the present specification and claims, the term "intrinsic viscosity" is a value expressed in deciliters per gram of polymer which is proportional to the effective hydrodynamic volume or size of the polymer in solution at zero concentration, i.e., at infinite dilution. See J. Polymer Science, Volume 5, pp 747–7 (1950). Intrinsic viscosity is determined from the rate of flow of dilute solutions of polyacrylamide in certain solvents. In the present invention, an initial polymer concentration of 2,500 ppm in a 3 percent sodium chloride brine is used as the starting point. The ratio of the viscosity of the solution of the polymer at this concentration to the viscosity of the solvent as measured at 30°C. is the relative viscosity at this concentration. The relative viscosity minus one is equal to the specific viscosity. The intrinsic viscosity is determined by plotting the ratio of the specific viscosity to the concentration of polymer against the concentration of the polymer and extrapolating the resulting plot to zero concentration.

Screen Factor

Testing for "screen factor" is done according to the Society of Petroleum Engineers Paper No. 2867.

Viscosity

Viscosity expresses the relationship of the resistance to flow of the polymer solution compared to water at a given temperature. Ordinary viscosities are measured directly in standard instruments such as the Brookfield viscometer, in which a spindle is rotated at a definite speed in the polymer solution and the resulting resistance to motion is measured in centipoises.

Nitrogen Content

A technique well known to analytical chemists, i.e., Kjeldahl Analysis, is used to determine the nitrogen content of the polymer solutions. Acrylamide monomer as well as unhydrolyzed polyacrylamide has a nitrogen content of 19.69 wt %. During the course of the simultaneous hydrolysis-solubilization, some partial hydrolysis does occur. This extent of hydrolysis is reflected in the observed nitrogen content of the polymer.

Examples

The invention will be more fully understood from the following examples which are to be taken as being merely illustrative of the invention.

EXAMPLE I

Figure 3:
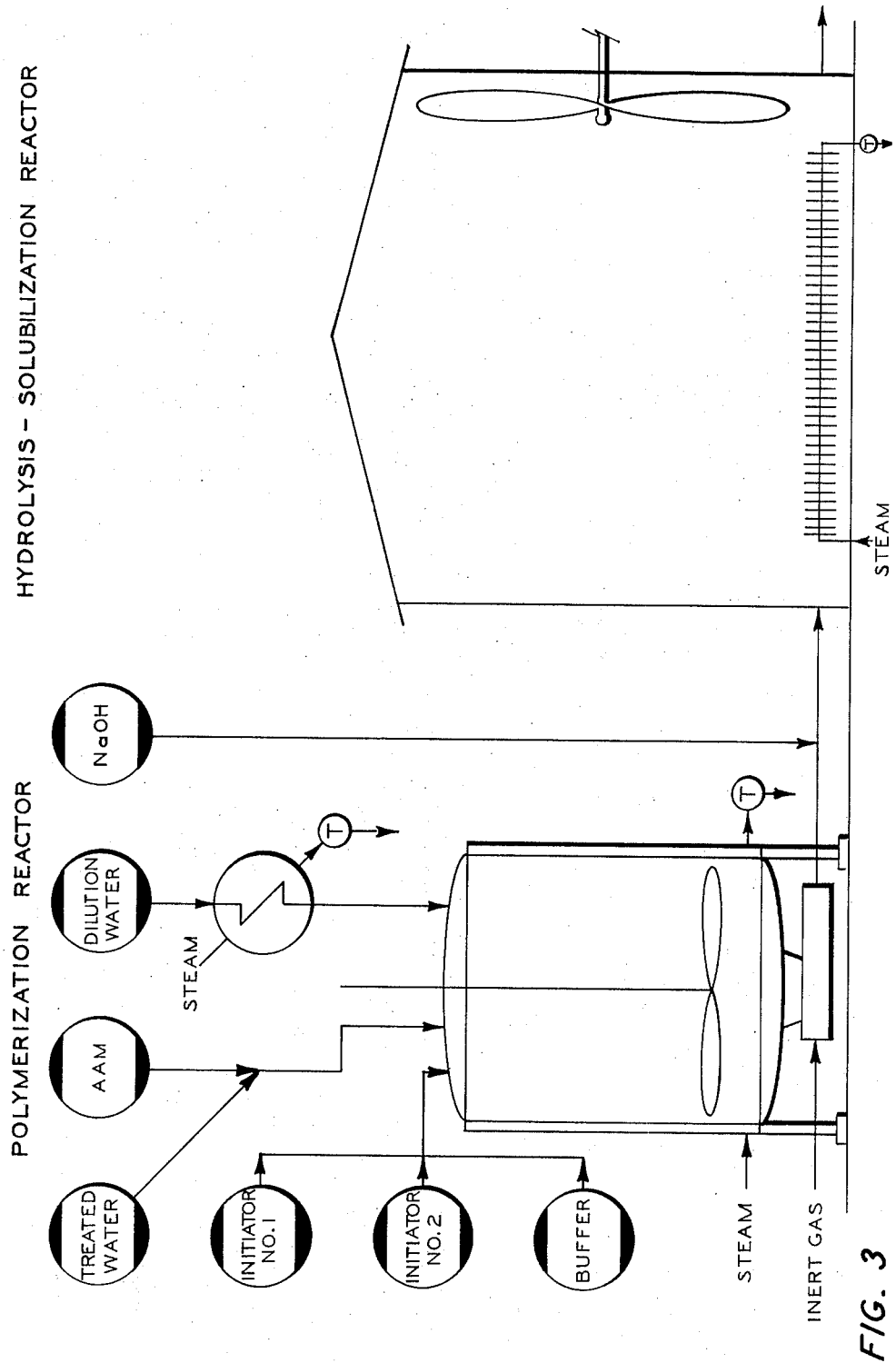
FIG. 3 is a schematic diagram showing the apparatus and feeds for the polymerization reactor used to produce polyacrylamide gels for use with the present invention and also the hydrolysis-solubilization reactor which is useful in the solubilization of such gels. The apparatus for the production of polyacrylamide solutions from polyacrylamide powders is similar, except that the powder and dilution water are merely fed to the reactor and the acrylamide monomer, treated water, buffer, and free radical initiators are eliminated.

Referring to FIG. 3, to a 1½-gallon reactor equipped with a means for hot water heating, mixing, and purging with an inert gas, is charged 4,750 grams of deoxygenated water substantially free from divalent ions (i.e., softened water). To this is added 250 grams of acrylamide monomer (AAM) powder to produce a concentration of 5.0 weight percent. This mixture is stirred, purged with inert nitrogen gas to insure that the mixture remains substantially oxygen-free, and heated to 40°C. for one-half hour. At this time, after the monomer has completely dissolved, 0.0075 moles of trisodium phosphate is added as a buffering compound to adjust the solution pH to 7. Free-radical initiators consisting of 400 ppm ammonium persulfate and 180 ppm sodium bisulfite based on acrylamide monomer charge are added to the reacting mixture. The reacting mixture is stirred slowly for one-half hour to insure complete mixing, and then let to set in a quiescent state for 23½ hours at a temperature of 40°C.

Polyacrylamide polymer produced in the reaction described above was a thick, rubbery gel with the following physical properties:

| | |
|---|---|
| Intrinsic viscosity, dl/g | 18.2 |
| Screen factor | 57.0 |
| Brookfield viscosity at 22°C. cp | 35.0 |

All physical properties of the polyacrylamide polymer were determined at a polymer concentration of 2,500 ppm in a 3 percent NaCl brine.

EXAMPLE II

In this example, 100 grams of the polyacrylamide gel prepared in Example I is charged to a 2-liter Morton flask. Acrylamide monomer concentration is adjusted to 0.5 weight percent by adding 900 grams of softened water. The pH of this unhomogeneous mixture is then adjusted to 12.2 by the addition of 0.5 moles of NaOH/mole acrylamide monomer.

This mixture is then heated at 75°C. with stirring (140 rpm) for 4 hours. Approximately one-half hour after starting the example run, the gel is completely in solution.

Analysis of the resulting polymer solution is as follows:

| | |
|---|---|
| Intrinsic viscosity, dl/g | 22.3 |
| Screen factor | 28.0 |
| Brookfield viscosity at 22°C, cp | 38.0 |
| Final solution pH | 11.2 |
| Solution viscosity at 22°C., cp | 7980 |
| % Nitrogen via Kjeldahl Analysis | 6.2 |

EXAMPLE III

This experiment is conducted exactly as Example II with the exception that the unhomogeneous mixture of polyacrylamide gel and dilution water is not pH-adjusted.

Approximately 4 hours are required before the polyacrylamide gel is completely in solution.

Analysis of the resulting polymer shows:

| | |
|---|---|
| Intrinsic viscosity, dl/g | 13.0 |
| Screen factor | 17.6 |
| Brookfield viscosity at 22°C., cp | 12.8 |
| Final solution pH | 7.0 |
| Solution viscosity at 22°C., cp | 130 |
| % Nitrogen via Kjeldahl Analysis | 17.2 |

EXAMPLES IV – VII

Figure 2:
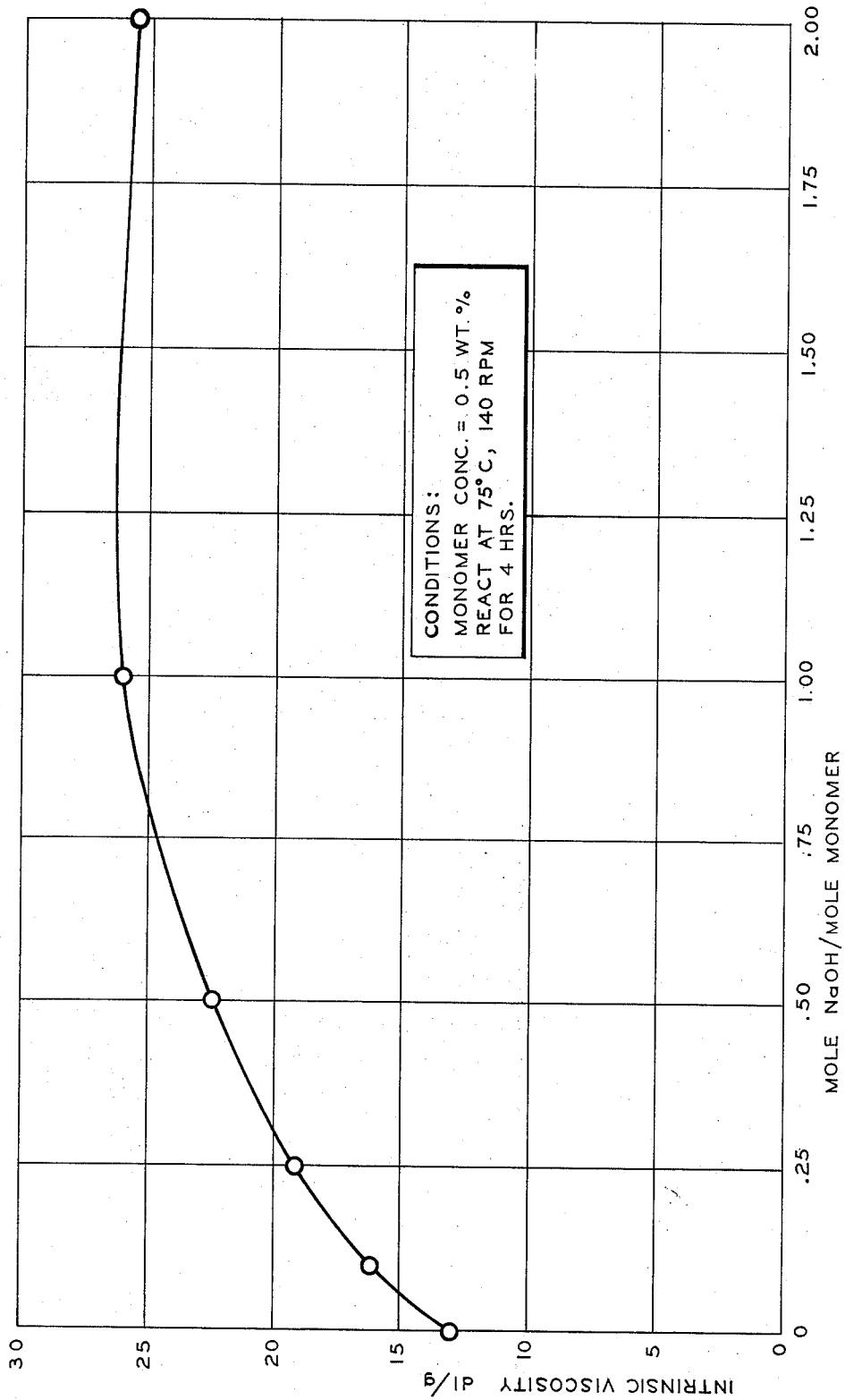
FIG. 2 is a plot showing the effects of stoichiometry on product intrinsic viscosity for Examples II–VII.

Table 1 shows the results for Examples IV – VII, each of which was conducted according to the techniques of Example II, except that the initial pH of the unhomogeneous solution was varied by changing the stoichiometric ratio of sodium hydroxide as shown in Table 1. FIG. 2 graphically shows the results of Examples II–VII.

TABLE 1

EFFECTS OF SODIUM HYDROXIDE STOICHIOMETRY ON PRODUCT INTRINSIC VISCOSITY

| Example No. | Initial pH | Mol NaOH Mol AAM | Intrinsic Viscosity,dl/g[1] | Screen Factor[1] | Brookfield Viscosity at 22°C.,cp[1] | Final Solution pH | Solution Viscosity at 22°C.,cp | % Nitrogen via Kjeldahl Analysis |
|---|---|---|---|---|---|---|---|---|
| IV | 11.5 | 0.10 | 16.1 | 14.8 | 18.7 | 9.45 | 933 | 12.9 |
| V | 11.8 | 0.25 | 19.1 | 16.2 | 30.3 | 10.2 | 7680 | 9.9 |
| VI | 12.2 | 1.00 | 26.0 | 27.1 | 45.0 | 12.0 | 7560 | 7.1 |
| VII | 12.4 | 2.00 | 25.6 | 36.9 | 45.6 | 12.4 | 1750 | 5.3 |

[1]Determined at 2500 ppm in 3% NaCl brine.

EXAMPLES VIII – IX

Table 2 shows Examples VIII–IX utilizing trisodium phosphate as the pH-adjusting agent and parameters as shown in Table 2. The techniques for these examples were otherwise identical to those of Example II. Results are substantially identical to those obtained in Example II.

TABLE 2

EFFECTS OF TRISODIUM PHOSPHATE STOICHIOMETRY ON PRODUCT INTRINSIC VISCOSITY

| Example No. | Initial pH | Trisodium Phosphate Concentration, wt % | Intrinsic Viscosity, dl/g[1] | Screen Factor[1] | Brookfield Viscosity at 22°C., cp[1] | Final Solution pH | Solution Viscosity at 22°C., cp | % Nitrogen via Kjeldahl Analysis |
|---|---|---|---|---|---|---|---|---|
| VIII | 11.0 | 0.6 | 20.5 | 22.5 | 33.7 | 9.9 | 3,140 | 13.0 |
| IX | 12.2 | 1.2 | 25.2 | 26.0 | 60.4 | 11.65 | 3,500 | 6.2 |

[1]Determined at 2500 ppm in 3% NaCl brine.

EXAMPLE X

When the techniques of Example II are repeated except utilizing a commercially available polyacrylamide gel (ICI 2402-70-5) purchased from ICI-America Corporation, the results are substantially identical with those obtained in Example II.

EXAMPLE XI

When the techniques of Example II are repeated except utilizing a commercially available polyacrylamide powder (Cyanamid P-250) purchased from American Cyanimid Company, the results are substantially identical with those obtained in Example II.

EXAMPLE XII

Displacement of Oil in Formation

Figure 1:
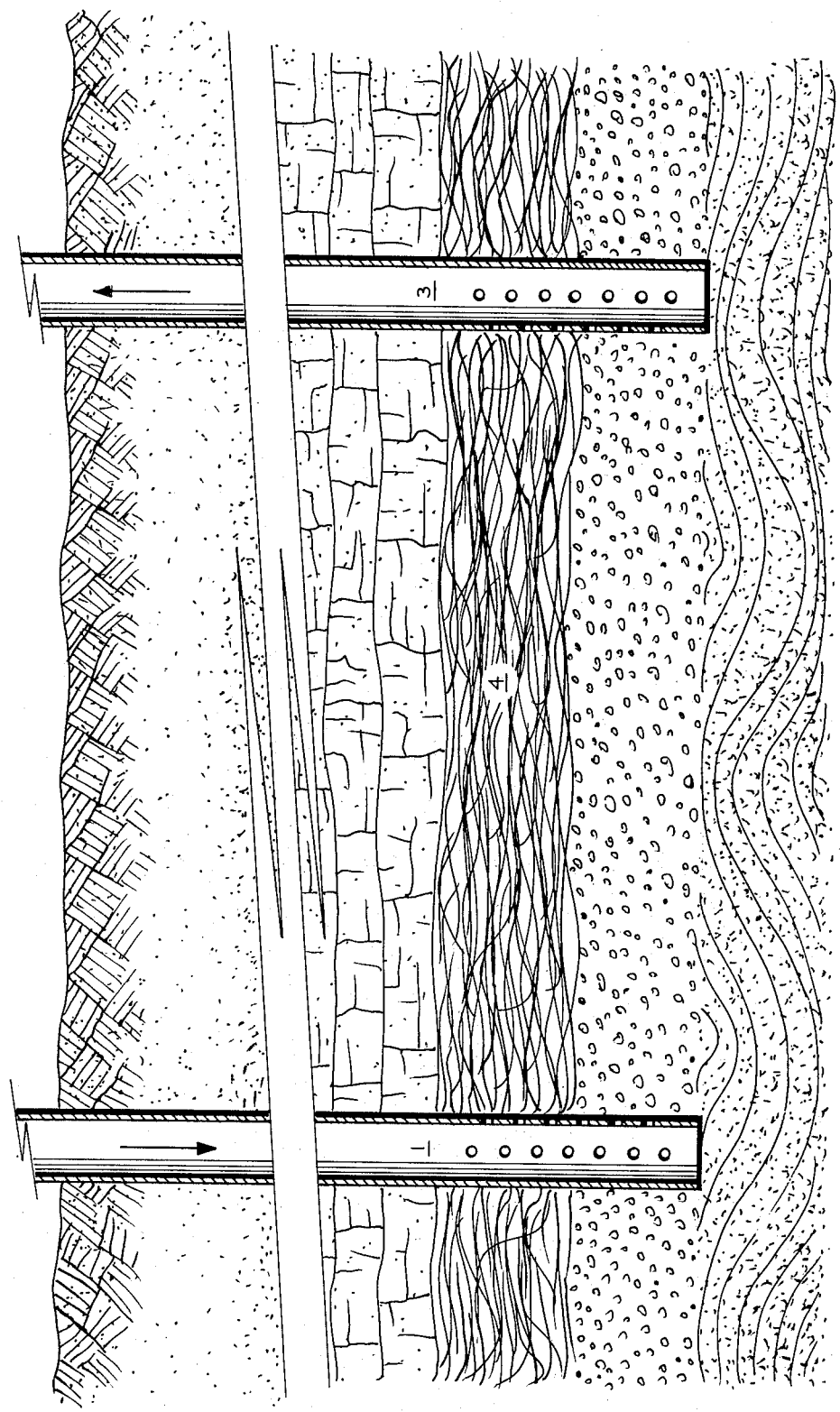
FIG. 1 is a schematic drawing showing the injection of the fluids of the present invention into a subterranean formation for purposes of displacing petroleum within the formation.

Referring to FIG. 1, an injection well 1 and a production well 3, each penetrate a reservoir comprising a zone 4 which is relatively oil-rich and has sufficient permeability to permit displacement of such oil in place. The reservoir was previously water flooded and much of the original oil-in-place has been removed from zone 4. However, approximately 20 percent of the pore volume of zone 4 remains filled with residual oil.

Attempts at further water flooding merely cause fingering due to the penetration of drive waters through a body of oil-in-place and leaving the body of oil-in-place substantially undisplaced.

According to the present invention, there is injected a 0.1 percent solution of the viscosity-increasing agent prepared according to Example II in fresh water. Injection is continued and oil is gradually displaced from the vicinity of injection well 1 into the vicinity of production well 3.

EXAMPLES XIII–XV

In these examples, 200 grams of polyacrylamide gel prepared in Example I is charged to a 2-liter Morton flask. Acrylamide monomer concentration is adjusted to 1.0 weight percent by adding 800 grams of softened water. The pH of this unhomogeneous mixture is then adjusted to 11.9 by the addition of 0.3 mole of NaOH/mole acrylamide monomer. Table 3 shows the results for Examples XIII-XV, each of which was conducted according to the technique just described, except that the reaction temperature was varied as shown in Table 3. FIG. 4 graphically shows the results of Examples XIII-XV.

TABLE 3
EFFECTS OF REACTION TEMPERATURE ON PRODUCT VISCOSITY

| Example No. | Reaction Temperature, °C. | Intrinsic Viscosity, dl/g[1] | Screen Factor[1] | Brookfield Viscosity at 22°C., cp | Solution Viscosity at 22°C., cp |
|---|---|---|---|---|---|
| XIII | 40 | 18.4 | 12.4 | 24.5 | 4,260 |
| XIV | 55 | 18.9 | 15.9 | 37.6 | 46,250 |
| XV | 75 | 19.0 | 13.3 | 26.8 | 43,350 |

[1]Determined at 2500 ppm in 3% NaCl brine.

MODIFICATIONS OF THE INVENTION

It should be understood that the invention is susceptible to a wide variety of modifications and variations which will be apparent to a person skilled in the art upon a reading of the present specification. All such variations and modifications are to be taken as being within the spirit of the claims appended hereto.

What is claimed is:

1. A process for the secondary type recovery of oil comprising in combination the injection into a subterranean oil-bearing formation of an aqueous polyacrylamide solution comprising the solution prepared by a process comprising
   a. adding a polyacrylamide gel or a polyacrylamide powder, which is substantially unhydrolyzed to a concentration of from 0.001 to about 50 weight percent polyacrylamide in dilution water,
   b. adjusting the pH of the resulting polyacrylamide-dilution water mixture as necessary to attain a pH of from about 7.5 to about 13, to effect simultaneous hydrolysis and solubilization and
   c. elevating the temperature of the resulting mixture to from about 55°C. to just below the boiling point of said mixture for a time of from about 0.1 to about 100 hours.

2. A process according to claim 1 wherein said polyacrylamide is in the form of a dry powder.

3. A process according to claim 1 wherein said polyacrylamide is in the form of a gel.

4. A process according to claim 3 wherein said polyacrylamide gel is prepared by:
   a. dissolving acrylamide monomer in deoxygenated water substantially free from divalent cations,
   b. adjusting the pH to about 7 by addition of buffer compounds,
   c. adding free radical initiator to the resulting buffered acrylamide-water mixture,
   d. maintaining the resulting mixture in a substantially quiescent state for a period of time sufficient to permit the formation of said polyacrylamide gel.

5. A process according to claim 4 wherein said free radical initiator is selected from the group consisting of: triethanolamine, ammonium persulfate, and sodium bisulfite and mixtures of the foregoing.

6. A process according to claim 5 wherein said free radical initiator comprises both ammonium persulfate and sodium bisulfite.

* * * * *